May 19, 1970  E. W. HINES ET AL  3,512,803
STABILIZING DEVICE FOR ARTICULATED VEHICLES
Filed Oct. 2, 1967  10 Sheets-Sheet 1

INVENTORS
EUGENE W. HINES
NORMAN F. LAPINE, SR.
HAROLD F. MENSING
CLIFFORD M. WAKEMAN
BY
ATTORNEY

INVENTORS
EUGENE W. HINES
NORMAN F. LAPINE, SR.
HAROLD F. MENSING
CLIFFORD M. WAKEMAN

BY 
ATTORNEY

INVENTORS
EUGENE W. HINES
NORMAN F. LAPINE, SR.
HAROLD F. MENSING
CLIFFORD M. WAKEMAN
BY
Hugh A Kirk
ATTORNEY

INVENTORS
EUGENE W. HINES
NORMAN F. LAPINE, SR.
HAROLD F. MENSING
CLIFFORD M. WAKEMAN
BY Hugh A Kirk
ATTORNEY

INVENTORS
EUGENE W. HINES
NORMAN F. LAPINE, SR.
HAROLD F. MENSING
CLIFFORD M. WAKEMAN

BY *Hugh A Kirk*
ATTORNEY

May 19, 1970  E. W. HINES ET AL  3,512,803
STABILIZING DEVICE FOR ARTICULATED VEHICLES
Filed Oct. 2, 1967  10 Sheets-Sheet 9

INVENTORS
EUGENE W. HINES
NORMAN F. LAPINE, SR.
HAROLD F. MENSING
CLIFFORD M. WAKEMAN

BY
ATTORNEY

INVENTORS
EUGENE W. HINES
NORMAN F. LAPINE, SR.
HAROLD F. MENSING
CLIFFORD M. WAKEMAN

BY Hugh A Kirk
ATTORNEY

United States Patent Office 3,512,803
Patented May 19, 1970

---

3,512,803
STABILIZING DEVICE FOR
ARTICULATED VEHICLES
Eugene W. Hines, Saline, Mich., Norman F. Lapine, Sr., Toledo, Ohio, and Harold F. Mensing, Monroe County, and Clifford M. Wakeman, Flint, Mich., assignors to The Mather Company, Sylvania, Ohio, a corporation of Ohio
Filed Oct. 2, 1967, Ser. No. 672,258
Int. Cl. B62d 1/06, 53/08
U.S. Cl. 280—432                                      26 Claims

ABSTRACT OF THE DISCLOSURE

An automatic fluid damping device connected to the vertical pivot connection between articulated vehicles to improve road stability including suppressing swaying and jackknifing, comprising an arm on the pivot connected to one of the vehicles to rotate the pivot with that vehicle as the vehicles articulate, and a vane also attached to the pivot which oscillates in a sector-shaped chamber fixed to the other vehicle, which chamber is filled with a damping fluid for restricting the rotation of the pivot within respect to the other vehicle. The housing for this chamber, or vane therein, includes a special sealing means and a passageway with a positively adjustable restricting, continuously open orifice therein for controlling the rate of flow of fluid from one side of the vane to the other in the chamber. This adjustably restricted passageway may be connected to a signalling means and/or to a hydraulically operated brake means for further restricting the relative articulated motion between the vehicles.

RELATED APPLICATIONS

Wakeman copending U.S. patent application Ser. No. 585,033 filed Oct. 7, 1966, and now Pat. No. 3,420548 on which the present application is an improvement.

BACKGROUND OF INVENTION

Rotary shock absorbers or damping devices are well known in the art as disclosed in Inman Pat. No. 1,782,725 issued Nov. 25, 1930, and even such rotary devices have been applied to the king pin of tractor-trailer articulated vehicles to reduce jackknifing as disclosed in Humphrey U.S. Pat. No. 2,170,898 issued Aug. 29, 1939. The automatically spring operated orifices or valves between the two chambers of the rotary hydraulic damping devices shown in these two patents, upon quick operation positively restrict all flow of the fluid and lock up the devices.

A lever arm which engages the slot in the fifth wheel of articulated vehicles for operating the king pin, which operation is restricted by a hydraulic piston action is known from the Black U.S. Pat. No. 2,692,146 issued Oct. 19, 1954.

Thus previous anti-jackknifing devices for articulated vehicles were heavy, expensive, hard to install, required special activating or engaging means required considerable alterations to the vehicle, and/or were not fail safe. Furthermore, many of these previous devices positively locked the units together not permitting the driver freedom or time to correct or drive out of a jackknifing action when it was sensed. Also many such previous devices were controlled by the driver either together with the brakes for the wheels of the vehicle or by a separate lever means, and if they were not timely operated they would have little or no effect. Some previously known devices require training on the part of the operator or driver of the vehicle in order to affect their proper operation, such as that for the device disclosed in the Hope et al. U.S. Pat. No. 3,328,051.

Accordingly so far no simple, effective, efficient, automatic, and economic device for improving road stability including suppressing swaying and jackknifing has been commercially placed on the market that overcomes all of the above mentioned problems.

SUMMARY OF THE INVENTION

Generally speaking, the stabilizing device for articulated vehicles according to this invention comprises an oscillatable hydraulic damping mechanism attached to the pivotal connection between such vehicles. This pivotal connection may comprise a ball and socket type joint as between an automobile and a detachable trailer, or a king pin and fifth wheel connection as between a tractor and a trailer or a dolly and a trailer. Such a fifth wheel is usually on the tractor vehicle and comprises a substantially horizontal plate with a rearwardly open slot therein for releasably engaging the king pin vertically depending from a wear plate on the trailer vehicle. The application of the present damping device comprises replacing only the normally fixed ball of a ball and socket joint connection, or normally fixed king pin, by a rotatable king pin having a lever arm formed to engage the tongue of a trailer or to fit as snugly as possible in the slightly different width and shaped slots in the fifth wheels of different tractors. This lever arm may have a thicker or offset end portion to insure engagement in the tongue or slot, if the tongue or fifth wheel plate tilts relative to the axis of the king pin, such as when the vehicles pass over a bump, crest, or depression in the road. This lever arm also may even include resilient means for permitting change of its width to fit different width tongues or slots in fifth wheels. Thus this lever arm causes the king pin to oscillate with one of the vehicles relative to the other. This king pin is mounted in a wear resistant bearing on one of the vehicles and is provided with a vane which oscillates in a sector-shaped fluid filled chamber mounted on that vehicle, such as on the upper side of the wear plate of a trailer. Thus, as this vane oscillates with the oscillation of the king pin, this oscillation is damped by the flow of the fluid in the chamber from one side of this vane to the other through a pasageway such as a duct provided in the housing of the chamber or through the vane itself. This passageway is provided with a manually preset or positively adjustable orifice means to restrict this flow and shear of the fluid through it, but not to block it completely so as to lock or prevent any oscillation when a relatively fast rate of turning or angularity occurs between the vehicles as during jackknifing. Accordingly, the predetermined restricted orifice means automatically dampens the oscillations sufficiently to suppress swaying and jackknifing, and also permits sensing of the start of a jackknifing action, so that the operator of the pulling vehicle or tractor can take corrective action to prevent complete jackknifing or unwanted swaying, and also has time to do so.

The orifice in this passageway is usually preset for the particular articulated vehicle and its usual load, and is not changeable by the driver or from the cab, so that the operation of this device is completely automatic. However, the orifice is so located that it can be readjusted by a mechanic when necessary without the removal of the device from the vehicle.

This orifice may, if desired, be controlled by special cam means and mounted on the king pin itself so that as the angle from alignment between the two vehicles increases, the orifice may be further restricted.

A fluid reservoir may be provided for automatically replenishing the fluid in the chamber in case any leakage occurs. Furthermore special means may be provided for sealing the vane and the chamber, such as special gaskets which seal the fluid from leakage around the vane during its oscillations, thereby insuring the proper control by the adjustable orifice in the passageway.

If desired, the passageway for the damping fluid may be bypassed for operating an audible and/or visual signalling device for the operator of the vehicles to further warn him of impending jackknifing or uncontrollable harmonic swaying.

Furthermore, the adjustable orificed passageway may be bypassed for operating a hydraulic brake which brakes a drum or disk that may be mounted on the king pin adjacent the housing for the sector-shaped chamber, and thereby further restrict or frictionally brake the angular movement between the vehicles when the rate and/or amount of angularity increases beyond a predetermined or preset amount.

Objects and advantages

Accordingly it is an object of this invention to produce a stabilizing device for articulated vehicles which increases its damping action the faster the change in angle between the vehicles occurs, and thus suppresses jackknifing of the vehicles as well as continuously restricts the swaying between the vehicles to provide better road stability and a more comfortable ride for the vehicles, which swaying may be caused by road conditions, equipment and tire failure, wind and passing vehicles. This in turn allows the driver to sense the start of jackknifing action in sufficient time to take corrective action, and prevent accidents.

Another object is to produce such a stabilizing device for articulated vehicles without affecting or disturbing the normal operation or turning of the vehicles, or without re-distribution of the load carried by the vehicles. Furthermore, it allows the usual braking and control systems to be more effective and thereby enhance their operation and safety of the vehicle.

Other objects are to provide such a stabilizing device which is automatic, adjustable, easily installed, light in weight, simple, economic, efficient, effective, self-lubricating, self-contained, quick releasing, fail safe, has few parts, low maintenance, and universal application, requires no external piping or electrical circuits, is not tied in with any other system of the vehicle, operates on curves as well as straight roads, is sealed from dirt and weather so as to be unaffected thereby, is tamper proof and fool proof, takes up no usable space in the vehicle for the load, and includes stopping means which restricts the angularity of the two vehicles, such as in a tractor-trailer so that the trailer will not go beyond about 104° from its aligned position so as not to materially damage the cab of the tractor vehicle.

BRIEF DESCRIPTION OF THE VIEWS

The above mentioned and other features, objects, and advantages, and the manner of attaining them are described more specifically below by reference to embodiments of this invention shown in the accompanying drawings, wherein.

DETAILED DESCRIPTIONS OF THE PREFERRED EMBODIMENTS

(A) The articulated vehicles (FIGS. 1–4)

Figure 1:
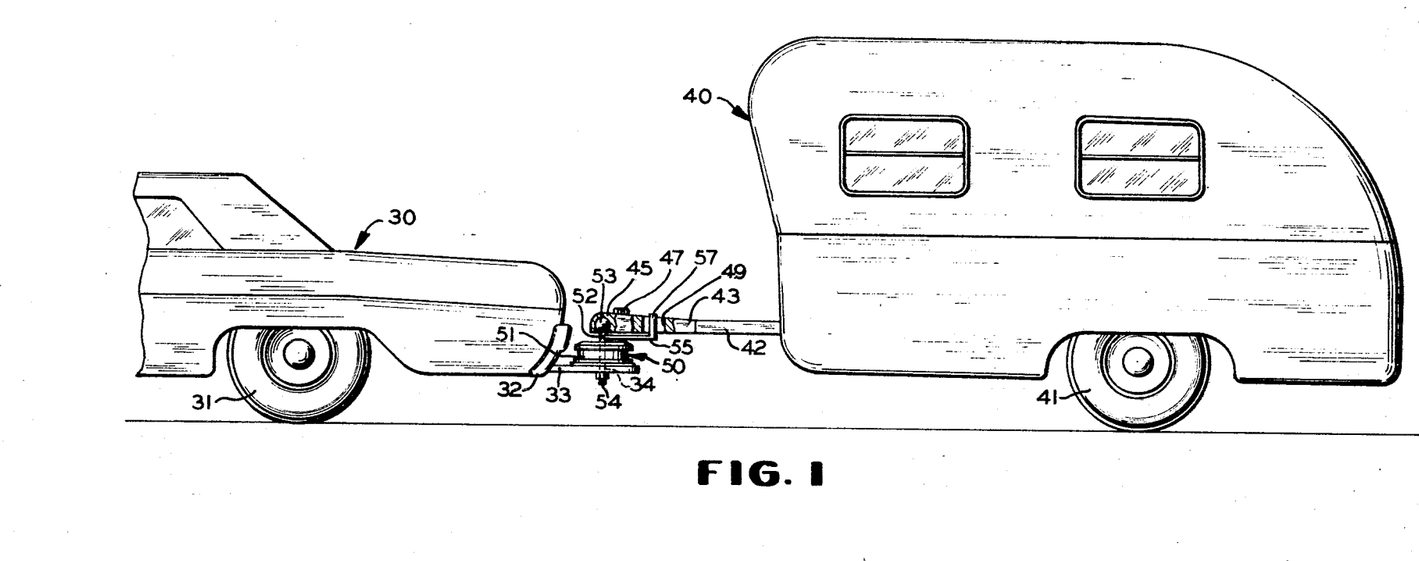
FIG. 1 is a side elevation of a trailer hitch connection for an automobile with major portions of the automobile being broken away and showing one embodiment of the automatic stabilizing device of this invention attached to the pivot of a ball and socket connection between the tongue of the trailer and the draft bracket on the automobile.
Figure 2:
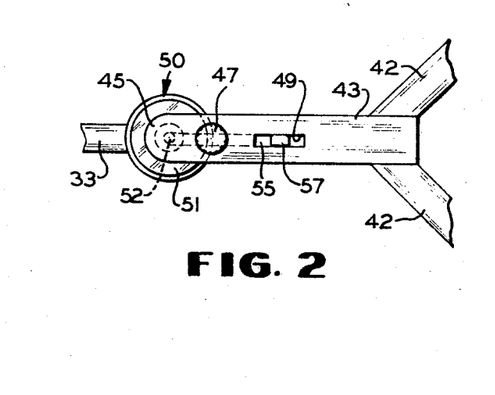
FIG. 2 is a plan view of the connection shown in FIG. 1 with the automobile and trailer being broken away.
Figure 3:
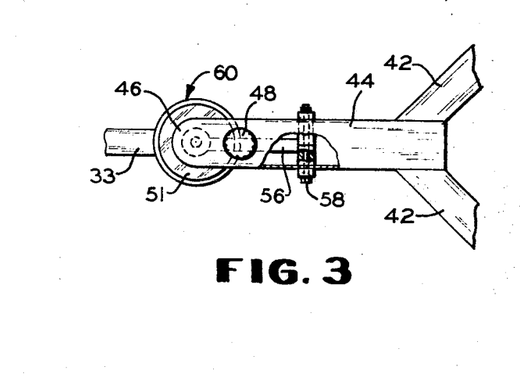
FIG. 3 is a plan view similar to FIG. 2 showing another structure for the lever arm of the stabilizing device shown in FIGS. 1 and 2.

(A) (1) *Automobile type trailer hitch (FIGS. 1–3)*.—In FIG. 1 there is shown a rear portion of an automobile 30 having a rear wheel 31 and attached to its under frame and/or rear bumper 32, a trailer hitch or draft bracket 33 having an aperture 34 therein. Behind the automobile 30 is shown a trailer 40 which may have a single pair of supporting wheels 41 and a forwardly projecting frame 42 provided with a central tongue extension 43 (or 44—see FIG. 3) having a forward downwardly open ball locking socket portion 45 (or 46—see FIG. 3) which may be provided with a threaded manually operated socket locking knob 47 (or 48). The tongue 43 shown in FIGS. 1 and 2 also may be provided with a centrally located axially elongated slot 49 for connection with a lever arm portion 55 of one embodiment 50 of the trailer hitch type stabilizing device 50, or 60 in FIG. 3, which may have a similar interior construction to any one of the devices 100, 200, 300, 400, 500, 600, 700, 800 or 900 herein after described.

As herein shown this particular stabilizing device 50 or 60 may comprise a cylindrical housing 51 through the center of which extends upwardly a ball ended pivot or type of king pin 52 the upper ball end 53 of which may lock into the socket of the tongue member 45 or 46. Depending from the bottom of this cylindrical housing 51 may be threaded bolt type extension 54 which may be locked from rotating in the opening 34 by means of a locking type nut and/or key means on the extension 54. Rigidly or fixedly attached to the king pin type pivot 52 below its ball end 53 is a lever arm 55 (or 56 in FIG. 3) which preferably is provided with an offset or upwardly extending projection means 57 (or yoke 58 in FIG. 3) for engagement with the tongue member 43 (or straddling the tongue 44 respectively). In the structure shown in FIGS. 1 and 2 the projection 57 fits into the slot 49, while in the structure shown in FIG. 3 no modification of the tongue of the trailer is necessary because the yoke 58 engages opposite sides of the tongue member 44. The yoke 58 may be adjustable in width to closely embrace different width tongues. Thus as the trailer 40 articulates with respect to the automobile 30, or vice versa, the king pin type pivot 52 of the stabilizing device 50 or 60 will follow this rotation and oscillate therewith in view of the connection through the lever arm 55 or 56 which engages the tongue 43 or 44 on the trailer 40. The upwardly extending projections 57 or 58 on these lever arms, permit vertical and angular variations between the draft bracket member 33 and the tongue 43 or 44, such as when these articulated vehicles go over a bump, crest, or dip in the road, and still maintain engagement of the lever arm 55 or 56 with the tongue 43 or 44 so that any and all pivotal oscillations or articulations around the axis of the pivot pin 51 will be transmitted to the stabilizing device 50 or 60.

This stabilizing device 50 or 60 comprises a fixed vane connected to the king pin pivot 52 which is damped in a sector-shaped chamber filled with a damping fluid, which device may be similar in structure to any one of the devices 100, 200, 300 400, 500, 600, 700, 800, or 900 according to this invention, described in the section (B) below.

Figure 4:
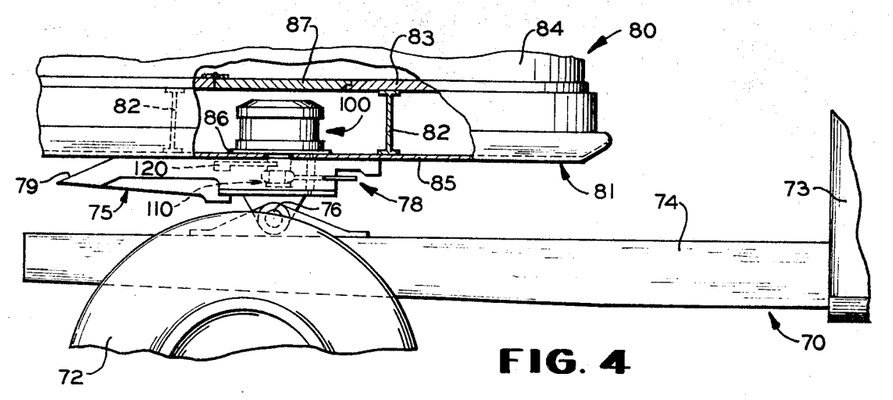
FIG. 4 is a side elevation of the fifth wheel and king pin connection between a tractor and a trailer with the major portions of the tractor and trailer being broken away, and showing another embodiment of the automatic stabilizing device of this invention attached to the king pin thereof.

(A)(2) *Tractor trailer connection (specifically FIG. 4)*.—Referring primarily to FIG. 4, there is shown a portion of a tractor 7 and trailer 80 of a pair of articulated vehicles. The parts of the tractor disclose comprise the frame 74, a portion of a rear wheel 72 mounted on the frame, and a portion of a cab 73 in which the driver of the tractor is usually located. The fifth wheel assembly 75 is shown mounted on a horizontal transverse pivotal axle 76 so as to be easily tiltable to fit flat against the wear plate 85 of the trailer 80. The fifth wheel 75 is provided with a rearwardly extending substantially V-shaped notch 76' (see FIGS. 5 and 6) with substantially parallel sides at its apex section forming a notch or slot 77, into which the king pin 110, 210, 410, 610 or 710 may slide.

Figure 5:
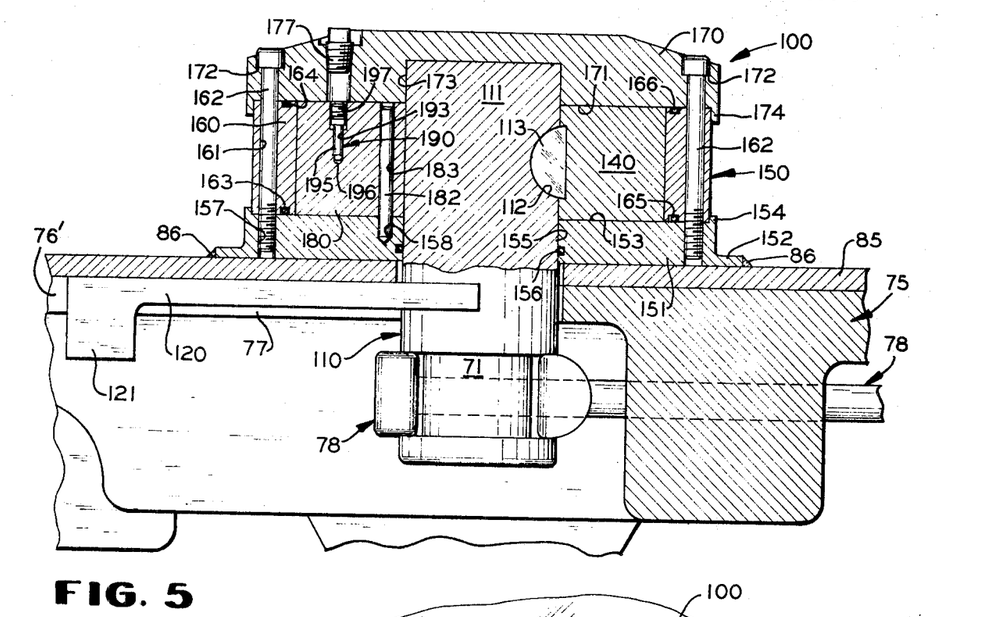
FIG. 5 is an enlarged vertical sectional view of the stabilizing device shown in FIG. 4 showing the lever arm, vane, and housing associated with the king pin, and parts of the adjacent wear plate and fifth wheel of the articulated vehicles.

Each of the king pins 110, 210, 410, 610 or 710 shown in FIGS. 5 (or 13 or 17), 11, 15, 20 or 23 (or 25 or 26), respectively, is provided at its lower end with the same type of grooved portion 71, for engagement with a locking device 78 on the tractor 70 to prevent the king pins 110, etc. from sliding out of the V-notch 76' and slot 77 when the tractor 70 is to be connected to the trailer 80.

The trailer 80 as shown in FIG. 4 comprises a frame 81 with cross members 82 which support a platform 83 which may be covered by a body section 84. Below the cross members 82 is provided the wear plate 85 which rests against the top of the fifth wheel 75 and is lubricated to permit articulated motion around the axis of the king pin 110.

Mounted on the vertical pivot or kings pins 110, 210, 410, 610 and 710 is the stabilizing device 100, 200, 300, 400, 590, 600 and 700, 800, 900 of this invention, each of which comprises a lever arm 120 (or 130—see FIGS. 7 and 8) attached to its king pin and the housing 150, 250, 350, 450, 550, 650 or 750 in which the king pin is journalled and which may be affixed to the opposite side of the wear plate 85 such as by means of welds 86 (see also FIGS. 5 and 6) directly to the lower outer flange portion or base plate of the housing 150, 250, 350, 450, 550, 650 or 750. Thus the tractor-trailer stabilizing device 100, 200, 300, 400, 500, 600, 700, 800 or 900 of this invention is so constructed to fit between two parallel cross members 82 of the trailer 80 and beneath the platform 83, or between it and the wear plate 85, thus taking up no usable space in the trailer. If desired, the platform 83 or floor of the trailer 80 may be provided with a removable panel or hatch 87 for easy access to the stabilizing device 100, 200, 300, 400, 500, 600, 700 800 or 900, such as for installation, removal, and/or filling with hydraulic fluid, adjustment of the orifice in the passageway therein, and/or the like.

(B) Stabilizing devices (FIGS. 5–10, 11–12, 13–14, 15–16, 17–19, 20–22, 23–24, 25, and 26)

For the purposes of clarity, the same parts in all of the figures will have the same reference characters, and similar parts or parts with similar functions in the different embodiments will in many cases have similar reference characters but with correspondingly different hundredths digits. For example, the embodiments shown in FIGS. 5 through 10 will have reference characters of the 100 series, FIGS. 11 and 12 of the 200 series, FIGS. 13 and 14 of the 300 series, FIGS. 15 and 16 of the 400 series, FIGS. 17 through 19 the 500 series, FIGS. 20 through 22 the 600 series, FIGS. 23 and 24 the 700 series, FIG. 25 the 800 series, and FIG. 26 the 900 series.

(B)(1) *Lever arm on pivot pin.*—Referring now primarily to FIGS. 5 through 8, the lever arm 120 or 130 is fixedly attached to the vertical pivot or king pin 110 (or 210, 410, 610 or 710) preferably above the groove 71, which attachment may be formed integrally with the king pin 110, etc. or may be welded or bolted thereto, as desired.

The outer end of the lever arm 120 or 130 is preferably provided with a downwardly extending offset portion 121 to insure its engagement into the sides 77 of the notch in the fifth wheel 75 regardless of its tilt or the location of the bevel 79 thereon, such as shown in FIG. 4.

Figure 6:
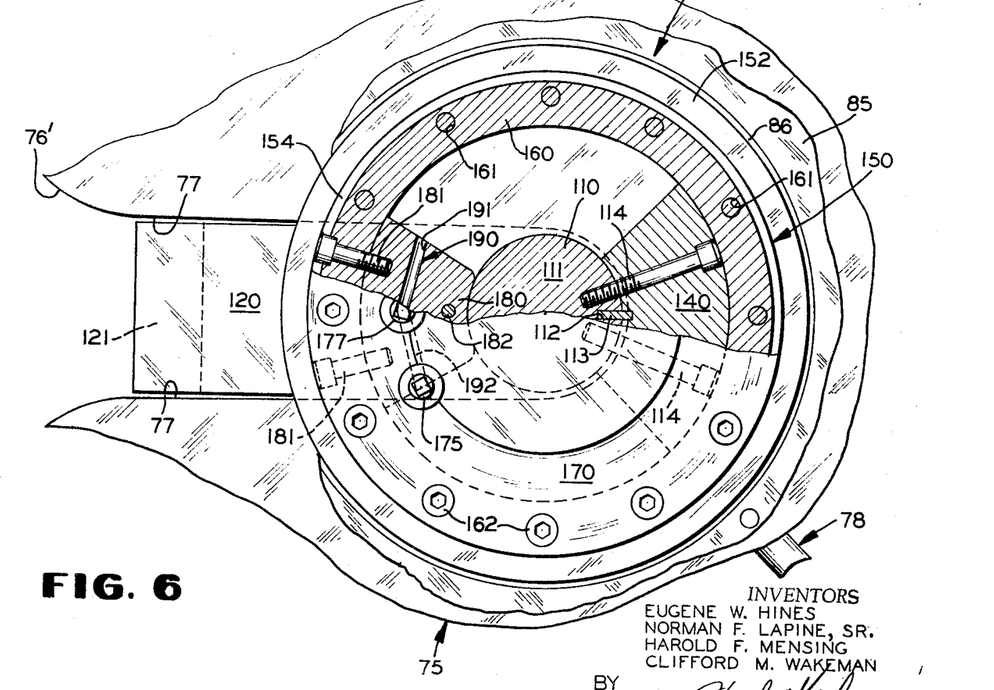
FIG. 6 is a plan view of the device shown in FIG. 5 with parts broken away to show the fixed and movable vanes in the sector-shaped chamber.
Figures 7, 8:
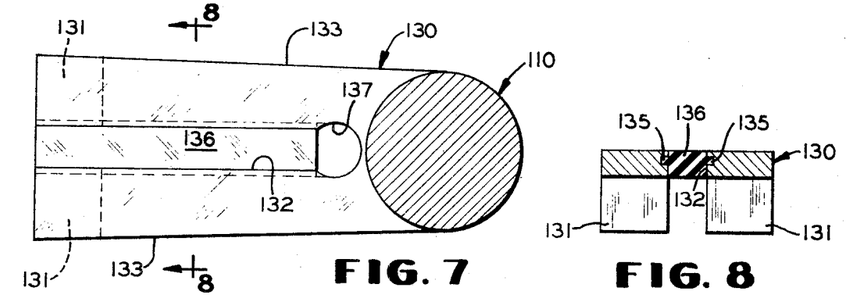
FIG. 7 is an enlarged plan view of a modified king pin lever arm shown in FIGS. 5 and 6 with a resilient insert therein.
FIG. 8 is a sectional view taken along line 8—8 of FIG. 7 showing the resilient insert in the center of the arm.

If desired, the lever arm 120 may be provided with a central slot or notch 132 as shown for the lever arm 130 in FIGS. 7 and 8 with a pair of offset ends 131 and sides substantially parallel to the sides 133, which notch may be grooved at 135 (see FIG. 8) to retain a snubber means, such as resilient plastic insert 136 of hard or synthetic rubber or a mechanical resilient snubber, which permits slight resiliency between the sides 133 to fit more snugly against the relatively parallel sides 77 of the apex portion of the notch 76 as shown in FIG. 6. The end of the notch 132 may be rounded at 137 as shown in FIG. 7 to permit more flexibility between these sides. Thus, the lever arm 130 may fit snugly into the notch 77 of the fifth wheel 75 regardless of the variations in these notches between different vehicles, thereby making the device of this invention substantially universal in application.

(B)(2) *Vane on pivot pin.*—Also integrally mounted with the pivot or king pin 110, 210, 410, 610 or 710 on an extension 111, 211, 411, 611, or 711 thereof into the housing 150, 250, 350, 450, 550, 650, or 750, there may be provided a vane 140 or 141, 240, 340 or 440 which herein is disclosed on the opposite side of the pivot or king pin 110 from the lever arm 120 or 130, although any or no angularity therein would not affect the operation or function of this invention. This vane 140 (or 141), 240, 340 or 440 is either integral or rigidly attached, such as by welding, bolting, and/or keying as shown by key slot 112 for key 113, to its associated pivot or king pin 110, 210, 410, 610 or 710 to rotate with the lever arm 120 or 130 as one vehicle 30 or 70 oscillates relative to the other vehicle 40 or 80, and therefore is referred to as a movable vane.

This extension 111, 211, 411, 611 or 711 of the pivot or king pin is preferably accurately machined and made of hardened steel to provide as durable a wearing surface as possible for its journal in the housing 150, 250, 350, 450, 550, 650 or 750. However, special bearings may be provided therefor without departing from the scope of this invention.

In addition to the key 113, the movable vane 140 (or 141), 240, 340 or 440 may be further attached to its pivot or king pin extension by means of bolts and/or pins 114 as shown for example in FIGS. 6, 12, 14 and 16. This movable vane 140 (or 141), 240, 340 or 440 may be sector-shaped as shown in FIGS. 6, 12, 14, 16, 18 and 21, which provides more mass by which it may be anchored to its pivot or king pin extension 111, etc. as well as to better fit into and abut against the ends of the sector-shaped chamber provided therefor in its housing 150, 250, 350, 450, 550, 650 or 750.

Figure 9:
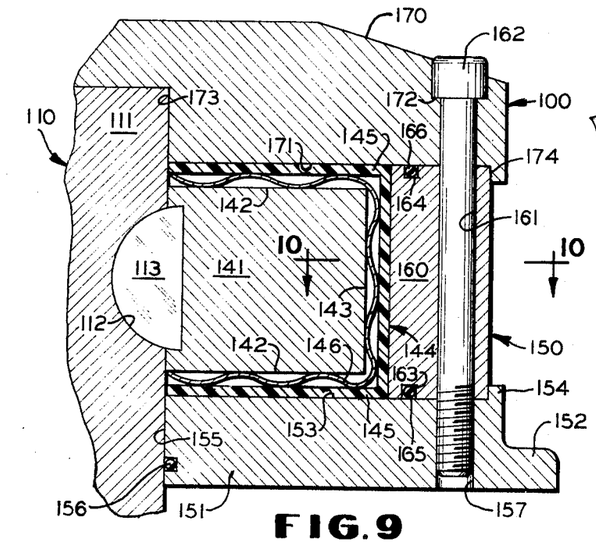
FIG. 9 is a partial vertical sectional view of a movable vane in its chamber, similar to that shown in FIG. 4, but showing a specific sealing means for the vane in the housing.
Figure 10:
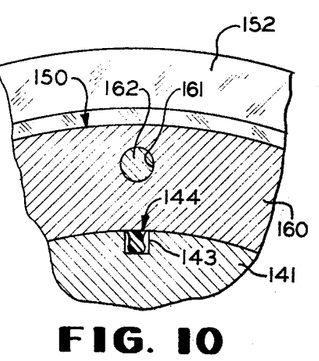
FIG. 10 is a further enlarged sectional view as would be taken along line 10—10 of FIG. 9 showing the cross section of the seal for the movable vane without its resilient back-up spring.

This movable vane 140 (or 141), 240, 340 or 440, may be accurately machined for its snug fit into the arcuate sector-shaped chamber of its housing, and/or it may be provided with special gasket means such as that disclosed in FIGS. 9 and 10 in which grooves 142 are provided in the top and bottom of the vane 141 which are joined by an axially parallel groove 143 into which grooves may be placed a special type U-shaped gasket 144 which may have a special cross-section as shown in FIG. 10 and also rectangular cross-section corner sections 145 to prevent leakage around the corner edges of the vane during its oscillations. Furthermore, if desired, this gasket 144 may be backed up by an outwardly urging back-up spring means 146 as shown in FIG. 9.

(B)(3) *The housing.*—Each housing 150, 250, 350, 450, 550, 650, or 750 throughout the figures of the different embodiments, comprises a base wall or plate 151, 551, or 751, which plate 151 or 551 may be provided with a circumferential outer peripheral flange 152 or 552 by which it may be welded at 86 to the opposite side of a wear plate 85 of one of the vehicles 80. The upper surface 153, 553, or 753 of this base plate 151, 551, or 751 is preferably accurately machined, and may have a peripheral shoulder 154 or 554 to provide a seat for the tubular sides of the housing. A central bearing hole 155, 555, or 755 in this base plate 151, 551, or 751 provides a journal for the extension 111, 211, 411, 611, or 711 of the pivot or king pin 110, etc., which hole may be sealed by a gasket such as an O-ring 156 in a groove provided in the hole. The gasket or O-ring 156 aids in preventing the fluid from leaking from the sector-shaped chambers in the housings 150, 250, 350, 450, 550, 650, and 750. Around the periphery of the base plate 151 or 751 there may be provided a plurality of circumferentially spaced tapped holes 157 or 757 for assembly bolts of which there may be a dozen. Also there may be provided another one or more holes 158 into which a locking pin 182 may be inserted for the fixed vanes 180, 280, 380, 480, 580, 680, and 780, as will be described later.

Adjacent the periphery of the base plate 151, 551 or 751 and adjacent the shoulder 154 or 554 there may be provided a hollow cylindrical or tubular side member 160, 560, or 760 which provides the arcuate outer wall of the sector-shaped chamber. This tubular member 160, 560 or 760 may be provided with a plurality of axially parallel holes 161, 561 or 761 for the assembly bolts 162 or 562. Inside these holes 161, 561 or 761 there may be provided a circular or annular end groove or grooves 163 and 164 for sealing O-rings 165 and 166, respectively, for sealing the ends of the tubular members 160, 560 and 760 to the surfaces 153, and 753 of the bottom plates 151 and 751 and to the surfaces 171, 271, 371, 471, 571, 671 and 771 of the cover plate 170, 270, 370, 470, 570, 670 and 770 of the housings 150, 250, 350, 450, 550, 650 and 750.

The circular cover walls or plates 170, 270, 370, 470, 570, 670 and 770 may be bevelled at their upper outer edges, and have spaced counter sunk holes 172, 272, 372, 472, 572, 672 and 772 around their peripheries for the assembly bolts 162 and 562. The lower surfaces 171, 271, 371, 471, 571, 671 and 771 of the cover plates 170, 270, 370, 470, 570, 670 and 770 may be accurately machined, as the surfaces 153, 553 and 753 of the base plates 151, 551 and 751 and the center of the surfaces 171, 271, 371, 471, 571, 671 and 771 may contain at least a counter-sunk portion 173, 273, 373, 473, 573, 673 or a hole 773 into which the outer end of the pivot or king pin extensions 111, 211, 411, 611 and 711 may be journalled. The cover plates 170, 270, 370, 470, 570, 670 and 770 also may have shoulders 174, 274, 374, 474, 574 and 674, similar to the shoulders 151 and/or 554 on the base plate 151 and 551 for seating the other end of tubular wall members 160, 560 and 760 of the housings. Furthermore, the cover plates 170, 270, 370, 470, 570, 670 and 770 are provided with additional tapped holes with plugs 175 (FIG. 6), 275 (FIGS. 11 and 12), 375 (FIG. 14) and 575 (FIGS. 18 and 21) for filling and emptying the sector-shaped chamber and portions thereof with fluid. Although the chamber of each embodiment has at least one such hole and plug, all are not visual in the figures shown.

Also the housings may be provided with an aperture which preferably is plugged, such as 177 (FIGS. 5 and 6), 277 (FIG. 12), 377 (FIG. 14) and 777 (FIG. 24), through which the adjustable orifice in the passageway between opposite sides of the sector-shaped chamber and movable vane 140 (or 141), 240, 340 or 440, may be adjusted, but such apertures will be described below in section (B)(4) on these passageways.

Opposite the movable vanes 140 (or 141), 240, 340 or 440 in each tubular housing members 160, 560 and 760 and fixed within the housings 150, 250, 350, 450, 550, 650 or 750 is a fixed partition or vane 180, 280, 380, 480, 580, 680 or 780 which forms the sector-shaped chamber in each housing in which the fluid is contained and movable vane 140 (or 141), 240, 340, or 440 oscillates. This fixed vane 180, 280, 380, 480, 580, 680 or 780 may be sector-shaped as the movable vane 140 (or 141), 240, 340 or 440, and it may be anchored to its housing 150, 250, 350, 450, 550, 650 or 750 such as by means of radial bolts 181, 281, 381, 481 as shown in FIGS. 6, 12, 14 and 16, and/or an axially parallel pin or pins 182, and/or welded to or made integral with an adjacent part or parts of its housing. One or more apertures 183, 283, 483 are provided in the fixed vanes 180, 280, 380, 480, 580, 680 or 780 through which these pins 182 extend and into the apertures 158 in the base plate 151, 551 or 751. The angular shape and width of the fixed vanes 180, 280, 380, 480, 580, 680 or 780 also act together with the shape and angle of the movable vanes 140, (or 141), 240, 340 or 440 as a positive stop or limit of movement for the movable vanes 140 (or 141), 240, 340 or 440, which aids in preventing one of the articulated vehicles from materially damaging the other when angle between them is more than about 90°. In the case of a tractor-trailer combination, this limiting angle has been determined to be about 208° or 104° in each direction.

(B)(4) *The passageways.*—(a) *In the housing (FIGS. 5–6, 11–12, 15–26).*—In the embodiments shown in FIGS. 5–6, 11–12, 15 through 26, the passageways 190, 290, 490, 590, 690, 790 between the opposite sides of the sector-shaped chambers formed between opposite sides of the fixed vanes 180, 280, 480, 580, 680 and 780 and in which the movable vanes 140, 240 and 440 oscillate, are provided through the housings 150, 250, 450, 550, 650 and 750 including in some embodiments through the fixed vanes 180, 480, 580, 680 and 780.

Referring first to FIGS. 5 and 6, this passageway 190 comprises segment ducts 191 and 192 extending in from opposite diverging sides of the fixed vane 180 to an axially aligned hole 193 into which is threaded a needle type valve means 195 for rigidly restricting the orifice 196 (see FIG. 5) in the passageway 190. This orifice 196 is usually preset for any particular vehicle and the valve 195 may be self-locking or locked in position by a locking screw 197 also in the threaded hole 193. Access to this adjustment may be had through a larger tapped and plugged hole 177 provided in the top plate 170.

Figure 11:
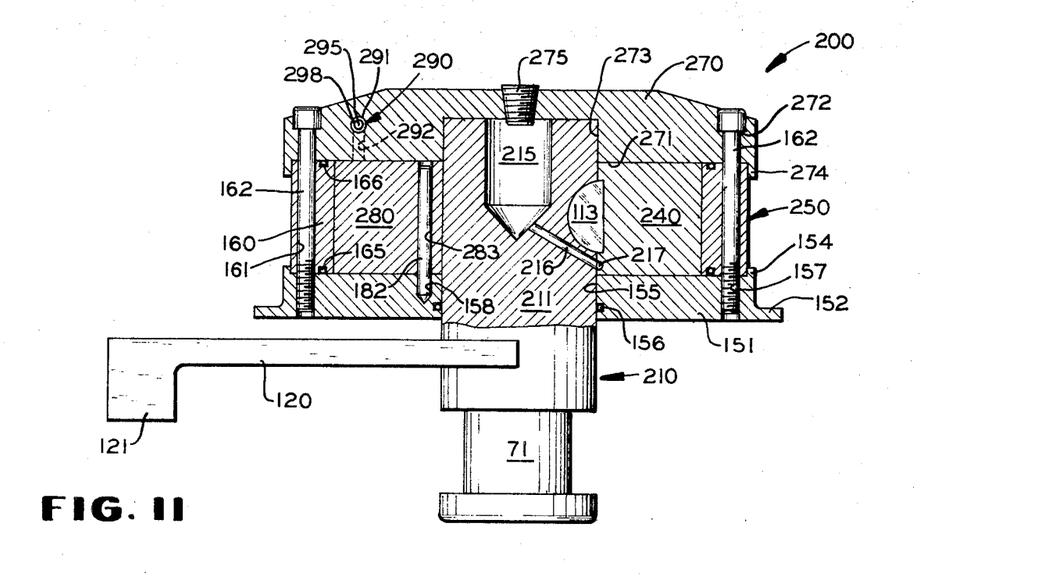
FIG. 11 is a vertical sectional view similar to FIG. 4 of another embodiment of this invention showing a different type of adjustable orifice for the passageway between opposite sides of the chamber on opposite sides of the movable vane, and also a reservoir for hydraulic fluid in the center of the king pin for fluid for the chamber.
Figure 12:
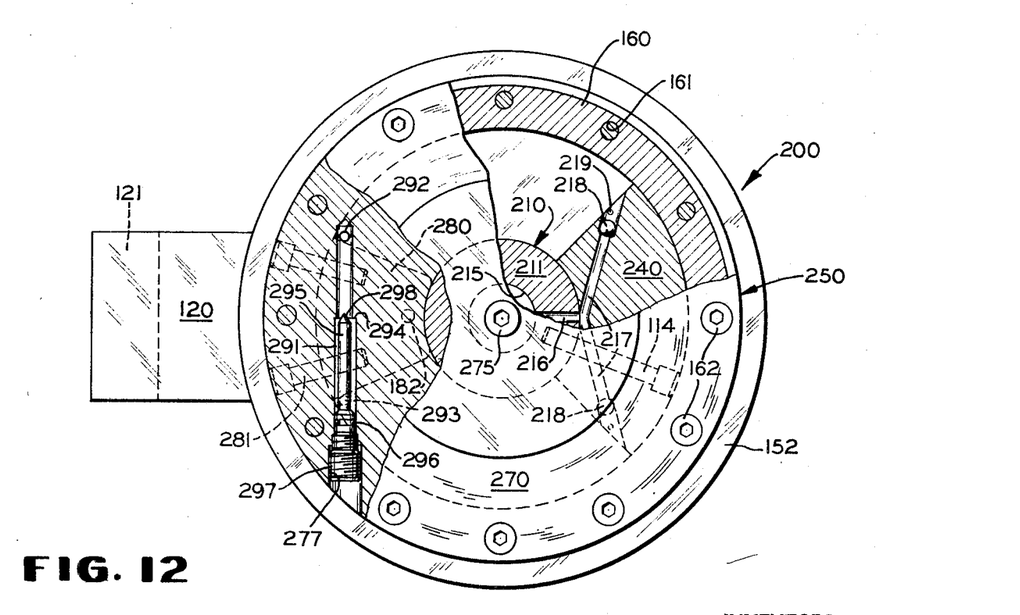
FIG. 12 is a plan view with parts broken away of the embodiment shown in FIG. 11 showing the adjustable orifice and ducts in the movable vane from the reservoir into both sides of the chamber.

In FIGS. 11 and 12 the passageway 290 is in the cover plate 270 through a segment stepped hole 291 threaded at its outer and larger diameter end. On opposite sides of the fixed vane 280 the hole 291 has downwardly open ducts 292 and 293 into the opposite sides of the sector-shaped chamber. This passageway 290 has between ducts 292 and 293 a stepped or shouldered valve seat portion 294 against which a threaded needle type valve member 295 may be adjusted at its threaded end. This valve stem 295 may be sealed in the duct or hole 291 with an O-ring 296 and also may be locked in position by a lock screw 297 as shown in FIG. 12. Thus access for adjusting the orifice 298 at the shoulder 294 in the passageway 291 may be had from the side of the cover plate 270 of the device 200 instead of from the top as shown in other of the embodiments of this invention.

The passageways 790 in the housings in the embodiments shown in FIGS. 23 through 26 may be similar to the passageways 190 shown in FIGS. 5 and 6, except that the adjustable orifice 791 therein (see FIG. 24) may be adjusted by a threaded needle valve 792 which extends through a radial threaded aperture or hole 793 which also may be capped by a plug 794 in wall 760. The passageways 790 in FIGS. 23 through 26 also have branching ducts 796 and 797 on each side of the orifice 791 for operating a signalling device 720 and/or a brake, as will be described later in section (B)(4)(e).

The adjustably restricted orifices for other passageways 490, 590, and 690 in the housings 450, 550, and 650 in FIGS. 15 through 22 will be described below in section (B)(4)(d), in that they all include cam type operated flow control means which are not solely preset by needle valves as described for those in this section.

Thus, the pre-adjustment of the orifice 196 as shown in FIG. 5 by means of the needle valve 195 positively restricts the flow of hydraulic fluid between the portions of the sector-shaped chamber on each side of the vanes 140 and 180 as the movable vane 140 moves, but it does not positively lock or prevent this movement. However, the faster the movement, the more the flow is restricted, so that easy and slow angular movement between the articulated vehicles which normally occurs in turning and driving the vehicles is relatively unrestricted. The faster movement which occurs when jackknifing action starts and occurs in thus damped by the devices of this invention, which permit the drivers of the vehicles to sense this action at its start in order to permit them to take corrective action, thereby avoiding jackknifing type accidents.

(B)(4)(b) *With reservoir (FIGS. 11 and 12).*—Referring now to the embodiments shown in FIGS. 11 and 12, there is also disclosed a reservoir 215 in the central upper portion of the king pin 210 which is connected by a duct 216 from its bottom to branching ducts 217 in the movable vane 240. These branching ducts 217 have in them check valves such as balls 218 acting against shoulder seats in these ducts and held in postion by pins 219, so that fluid from the reservoir 215 will only flow into the two vane-separated portions of the sector-shaped chamber when the fluid in that sector is not under compression by the movable vane 240 and more fluid is needed in that sector to fill it. Thus, both portions of the sector-shaped chamber on either side of the movable vane 240 are maintained filled with fluid from the reservoir 215 as the device operates to insure the proper and constant damping by the device even if some fluid leaks around the seals for the chamber. Access to the reservoir 215 for filling may be through the threaded plug 275 in the center of the cover plate 270.

The fluid may be a hydraulic fluid which generally is a high V. I. oil to be as unaffected by changes in temperature as possible. A suitable petroleum oil which has been used had a viscosity of about 90 centistokes, however, other oils including silicone oils may be used. The more viscous the oil used the less tolerance is required by the sealing means and moving surfaces between the parts.

Figure 13:
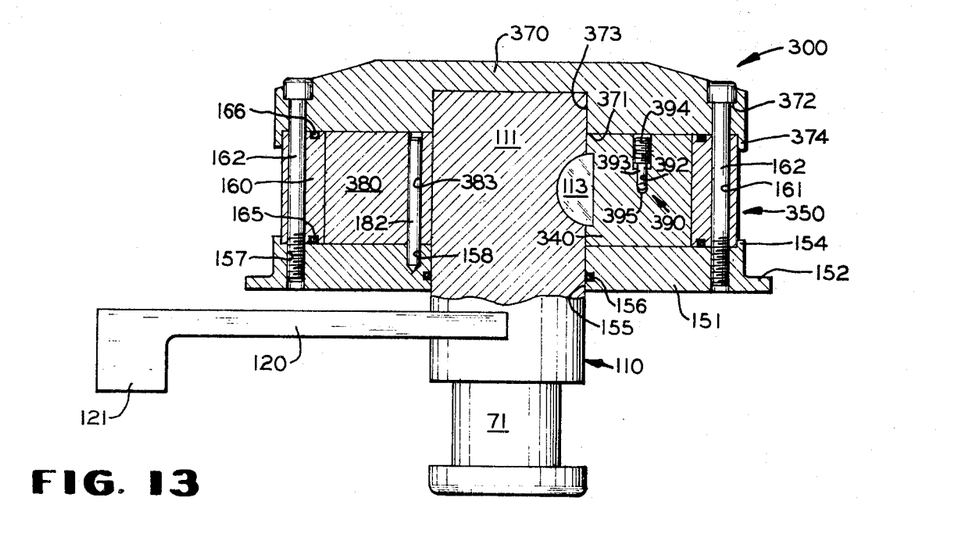
FIG. 13 is a vertical sectional view similar to FIG. 4 of another embodiment of the stabilizing device of this invention showing the adjustable orifice in a passageway in the movable vane.
Figure 14:
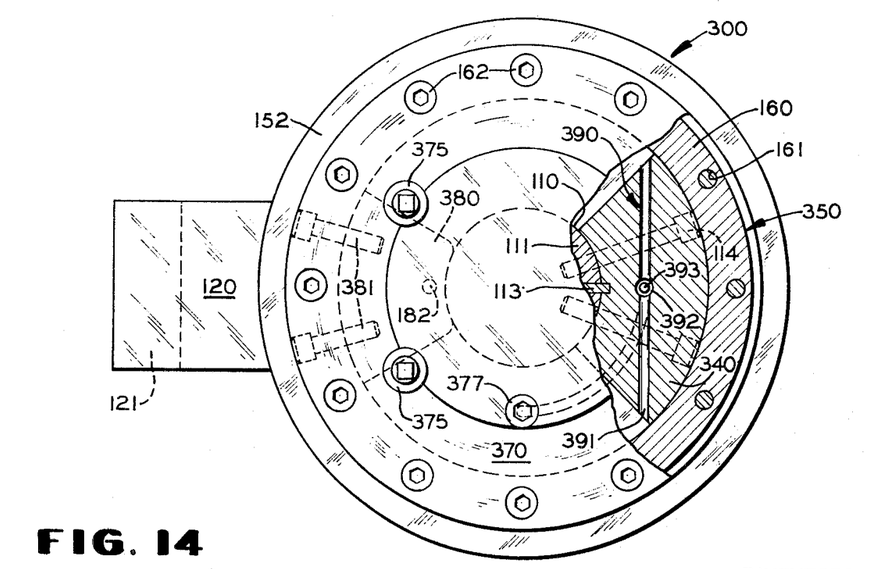
FIG. 14 is a plan view with parts broken away of the embodiment shown in FIG. 13.

(B)(4)(c) *Passageway in the vane (FIGS. 13 and 14).*—Referring next to the embodiment shown in FIGS. 13 and 14, the movable vane 340 is shown to be provided wih a segment duct or hole 391 for the passageway 390, the central portion of which is vertically connected to a threaded hole 392 for a threaded needle type valve 393, which may be held in place by a lock 394. This valve 393 is preset to gauge the orifice 395 in the passageway 390. Access to this lock screw 394 and valve 393 for readjustment of the orifice 395 may be had by moving the movable vane 340 into such an angular position that its hole aligns vertically with the plugged hole 377 (see FIG. 14) in the cover plate 370 and then removing the plug 377.

It is to be noted that the adjustment of the orifices of the devices of this invention may be made without completely disassembling the devices.

Figure 15:
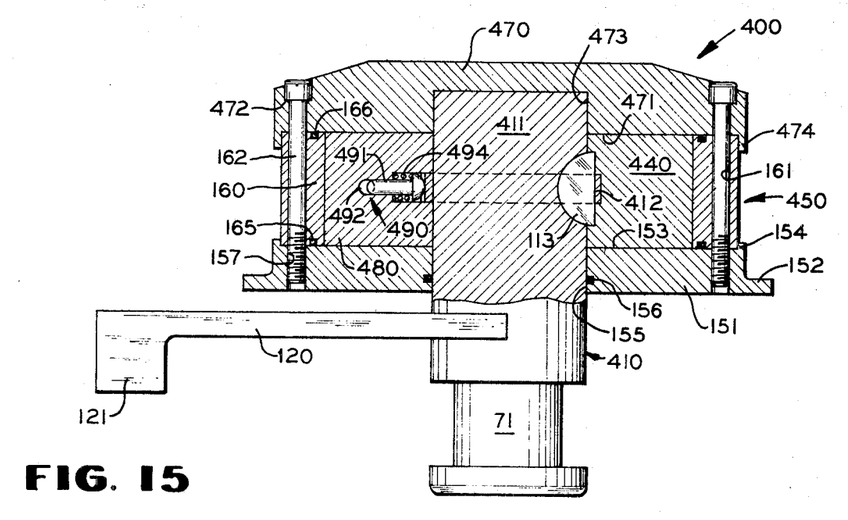
FIG. 15 is a vertical sectional view similar to FIG. 4 of a further embodiment of this invention showing a variable orifice in the passageway between opposite sides of the chambers, which orifice is operated by a fixed cam on the king pin.
Figure 16:
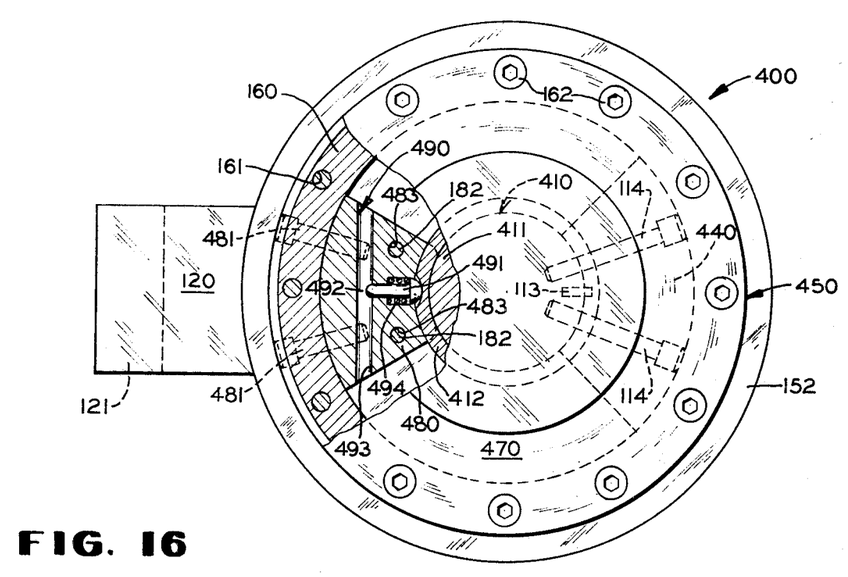
FIG. 16 is a plan view of the embodiment shown in FIG. 15 with parts broken away to show the cam and adjustable orifice.
Figure 17:
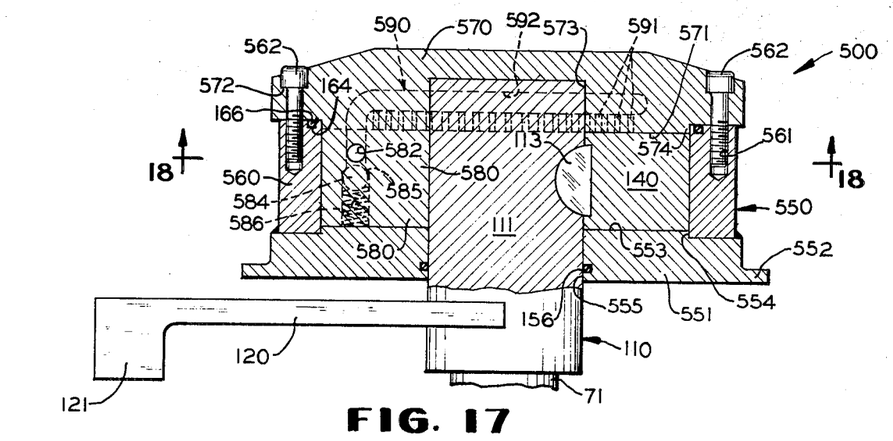
FIG. 17 is a vertical sectional view similar to FIG. 4 of a further embodiment of this invention showing another type of adjustable orifice means in the top plate of the device which is gated by the motion of the movable vane.
Figure 18:
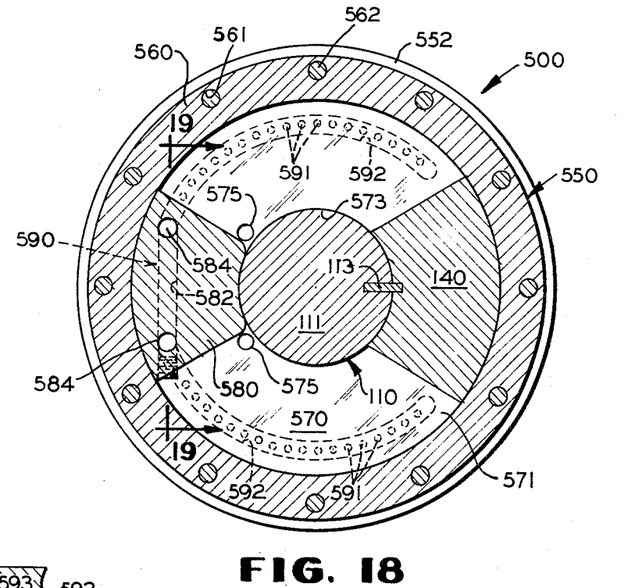
FIG. 18 is a sectional view taken in the direction of the arrows 18—18 of FIG. 17 showing the location of the orifices gated by the movable vane.
Figure 19:
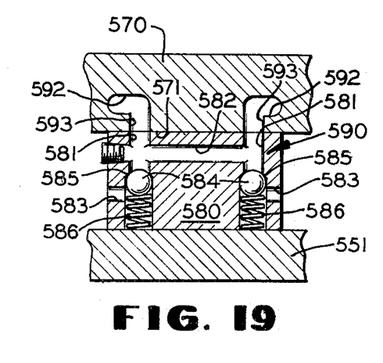
FIG. 19 is a sectional view taken along line 19—19 of FIG. 18 showing the venting valves from the orifice arcs shown in FIGS. 17 and 18.

(B)(4)(d) *Cam control passageway (FIGS. 15–21).*—In FIGS. 15 and 16 the pivot or king pin extension 411 is shown provided with an integral or rigidly attached cam 412, the outer peripheral surface of which cooperates with cam follower valve pin 491 for reducing the orifice 492 in the segment duct 493 forming the passageway 490 in the fixed vane 480. This cam operated valve 491 is urged against the peripheral surface of the cam 412 by means of spring 494. Thus in the operation of this mechanism as shown, as long as the angle between the articulated vehicles is relatively small, the orifice 492 in the passageway 490 or duct 493 is relatively large so that even quick small angular changes can readily occur without too much restriction. However, if the angle becomes greater between the two articulated vehicles, then the cam 412 operates the valve 491 to restrict further the orifice 492 in the passageway 490 to increase the damping action, so that the operator of the vehicle can sense jackknifing action in time to take corrective measures against it.

In FIGS. 17 through 22 there is disclosed another type of cam operated adjustable orifice in the arcuate passageways 590 and 690 in the cover plates 570 and 670 of the embodiments 500 anl 600. These passageways 590 and 690 extend between opposite sides of the sector-shaped chambers and movable vanes 140, wherein the vanes 140 act as a cam type gating means for varying the number of orifices or inlets 591 tand 691 which are connected in parallel to the arcuate ducts 592 and 691, respectively.

These arcuate ducts 592 and 692 may be cast directly into their cover plates 570 and 670, or these cover plates may be made in two parallel parts split along the horizontal plane of the axis through the centers of the arcuate ducts 592 and 692. These arcuate ducts 592 and 692 extend substantially completely over both portions of the sector-shaped chamber on either side of the movable vanes 140 (see FIGS. 18 and 21) and may be connected together either through the duct 694 provided in the top plate 670 (see FIG. 22) or through branch ducts 593 (see FIG. 19) connected to axially parallel extending ducts 581 in the fixed vane 580 which are connected together by a segment duct 582 provided in the fixed vane 580. Vertical branch ducts 693, similar to ducts 593, may also be provided in the embodiment 600 which connect to axially parallel ducts 681 in the fixed vane 680. Each of these vertical or axially parallel ducts 581 and 681 in the fixed vanes 580 and 680 are connected to their adjacent sides of the sector-shaped chamber through ducts 583 and 683. Between these ducts 583 or 683 and their cross connecting ducts 582 and 694 there are provided check valves in each of the ducts 581 and 681. These check valves may comprise balls 584 held against shoulder seats 585 and 685 in the ducts 581 and 681, and urged against these seats by means of springs 586. Thus as the movable vanes 140 move in either direction, they will force the fluid in their respective chambers up through the parallel orifices or inlets 591 and 691 into the passageways 590 and 690 of arcuate ducts 592 and 692 and out through the open inlets 591 or 691 in the other portion of the chamber, and/or down through one of the ducts 593, 581, 583 and 693, 681, 683 through check valves 584 out into the other portion of the chamber. However, as the movable vanes 140 move farther and farther, or at a greater angle from its position opposite the fixed vanes 580 or 680, more and more of the inlets 591 and 691 entering the passagseways 590 and 690 will be closed, thereby restricting automatically the amount of fluid which can pass from that chamber portion to the other chamber portion, and thus increasing the damping action of the devices as the angles between the vehicles increase. It is to be understood that the location of the outer ends of the inlets 591 and 691 and their spacing and sizes in the arcuate ducts 592 and 692 may be varied with respect to the gating edges of the movable vane 140 without departing from the scope of this invention.

Figure 20:
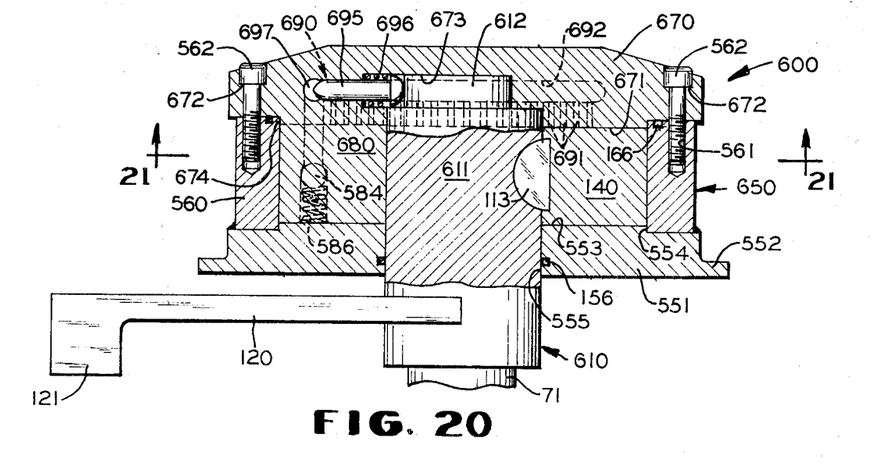
FIG. 20 is a vertical sectional view similar to FIG. 17 showing in addition thereto a cam means on the king pin for further varying the orifice in the passageway between the chambers, in addition to the variable gating of the orifices by the movable vane.
Figure 21:
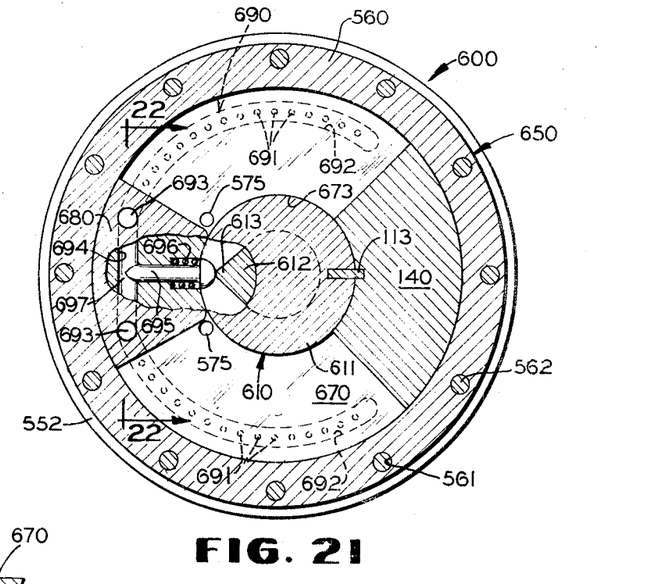
FIG. 21 is a horizontal sectional view taken along line 21—21 of FIG. 20 in the direction of the arrows, with parts broken away and showing one embodiment of a cam which may be used for varying the orifice in the passageway between the chambers.
Figure 22:
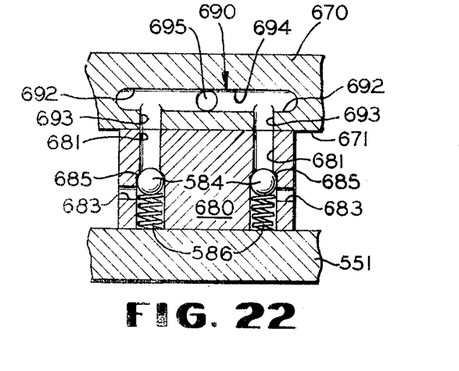
FIG. 22 is a vertical sectional view similar to FIG. 19 but taken along line 22—22 of FIG. 21.

In FIGS. 20, 21, and 22 the movable vane 140 variable orifice gating means of passageways 690 is also provided with a cam operated restricting valve 695 in the cross duct 694 in the cover plate 670. In this embodiment 600 the extension 611 of the pivot or king pin 610 is provided with a cam 612 at its upper end which may have a lobe 613 that operates the cam following end of the valves 695 against a spring 696 to vary the orifice 697 in the cross duct 694. The lobe 613 on the cam 612 restricts the orifice 697 more at the smaller angles of the movable vane 140 to reduce swaying between the vehicles, and then opens the orifice 697 when greater angularity between the vehicles occurs so that then the plurality of inlets 691 gated by the movable vane 140 can take over the reduction of the flow through the passageway 690, similarly to that described for embodiment 500 above.

(B)(4)(e) *Signal and/or control brake (FIGS. 23–26)*.—In FIGS. 23 through 26, there is shown connected to the pair of branch ducts 796 and 797 from either side of the orifice 791 in the passageway 790, a self-actuated shuttle valve 730 into opposite ends of which the ducts 796 and 797 enter. This valve contains a floating gate 731 (see FIG. 24) which alternately opens and closes the ducts 796 and 797 depending upon which one is under pressure due to the motion of the movable vane 740, so that which ever section or portion of the sector-shaped chamber has pressure, this pressure will be conducted through this valve 730 and thence into duct 732.

Branching from or connected to this duct 732 may be a valved duct 733 connected to a pressure responsive switch 720 (see FIGS. 23 and 24), which switch may be regulated by a manual adjustment 721 to respond to a predetermined pressure of the fluid in the sector-shaped chamber depending upon the movement of movable vane 740. This pressure responsive switch 720 may be electrically connected by means of conductors 722 to operate a visual and/or audible signalling means (not shown) in the cab or operating compartment for the driver of the vehicles 30 or 70 as an additional safety measure to alert the driver when a jackknifing or undesirable swaying- action starts.

Still further in FIGS. 23 through 26 the duct 732 from the shuttle valve 730 may connect to a brake operating cylinder for a hydraulic brake to be applied to the pivot or king pin 710 to further restrict the angular motion of the vehicles in addition to the damping action of the devices 750.

Figure 23:
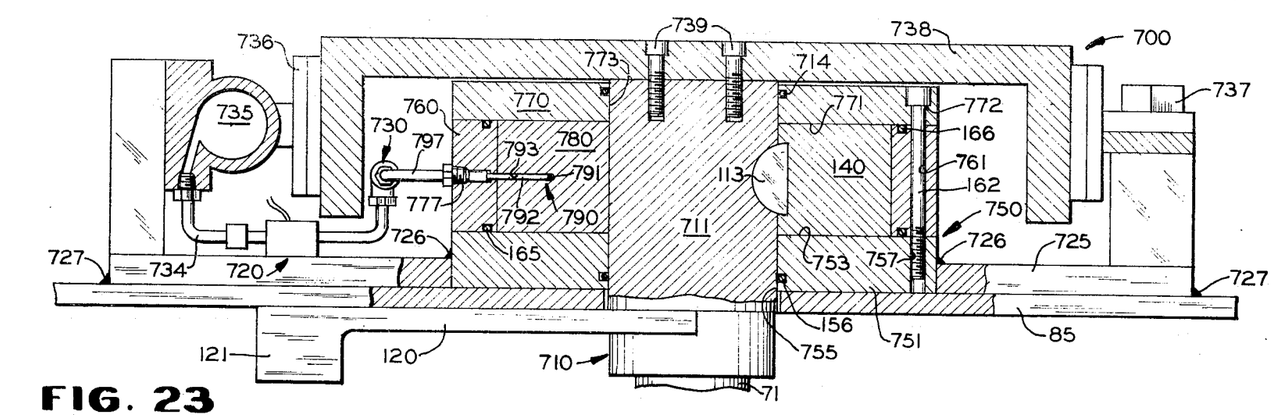
FIG. 23 is a reduced vertical sectional view of a still further embodiment of the device similar to that shown in FIG. 4, and including a brake drum mounted on the top of the king pin over the housing and branch duct means connected to the orifice restricted passageway for a signalling device and/or for operating brake shoes against the outside of the brake drum.
Figure 24:
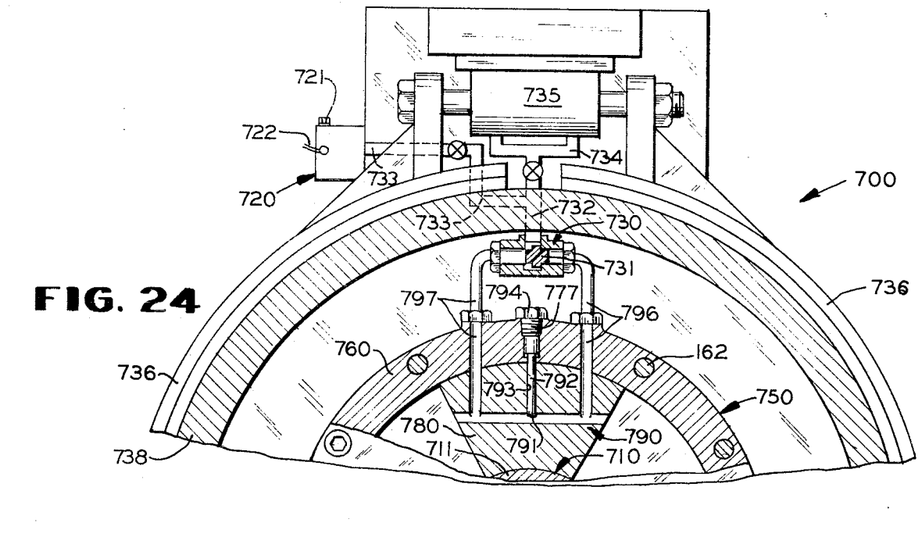
FIG. 24 is a top plan view of the embodiment shown in FIG. 23 with parts broken away to show the branch duct means and variable orifice connected to the passageway between the opposite sides of the sector-shaped chamber.

In FIGS. 23 and 24 this duct 732 from the shuttle valve 730 is connected to a valved duct 734 connected to the opposite ends of a double piston brake cylinder 735, whose pistons operate the exterior pair of brake shoes 736 pivoted on post 737 on the opposite side of a brake drum 738 from the cylinder 735. Instead of the brake cylinder 735 having two pistons, it may have only one piston and a linkage for operating the brake shoes 736 without departing from the scope of this invention.

This brake drum 738 is connected to the upper projecting butt end of the king pin extension 711 such as by means of a plurality of bolts 739. Since the extension 711 of the pivot or king pin 710 extends through the top plate 770, there is provided a sealing gasket 714 in the aperture 773 to prevent leakage of the fluid from the sector-shaped chamber.

The pivot post 737 and cylinder 735 may be mounted on a common plate 725 which may be cut out in its center to receive the base plate 751 of the damping device 750, and to which it may be welded as at 726. This plate 725, together with the damping device 750, then may be mounted on top of the wear plate 85, either by bolts or welding 727 as shown.

Figure 25:
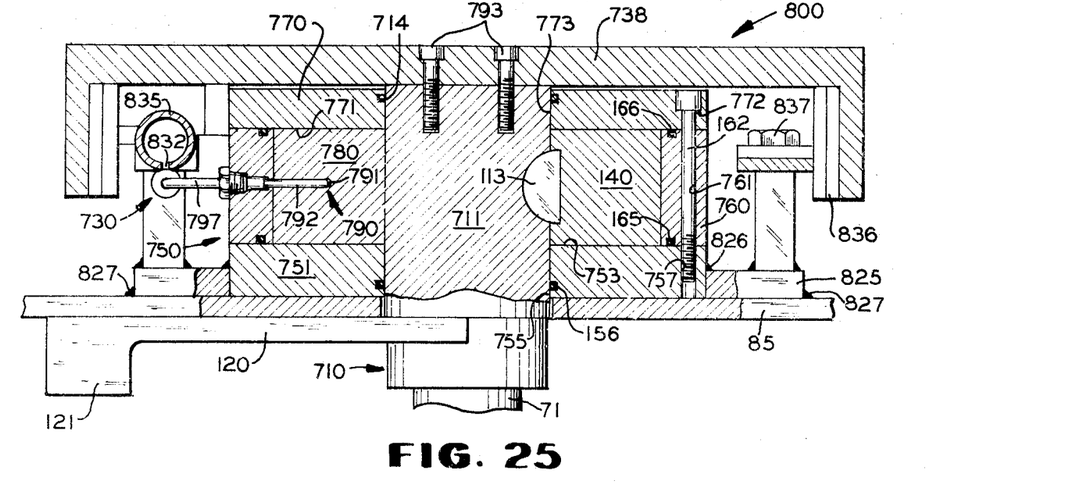
FIG. 25 is a reduced vertical sectional view of an embodiment similar to that shown in FIG. 23 but with the brake shoes inside of the drum mounted on the king pin.

If desired the brake drum 738 may have internal shoes 836 as shown in FIG. 25 and be operated by a single piston brake cylinder 835 connected to duct 832 from the shuttle valve 730. Similarly, the pivot support 837 for these shoes 836 and the support for the brake cylinder 835 may be mounted on a plate 825 which has a center aperture into which the damping device 750 may be welded at 826, and then this plate 825 may be mounted on the wear plate 85 by bolts or welding 827 as shown in FIG. 25.

Figure 26:
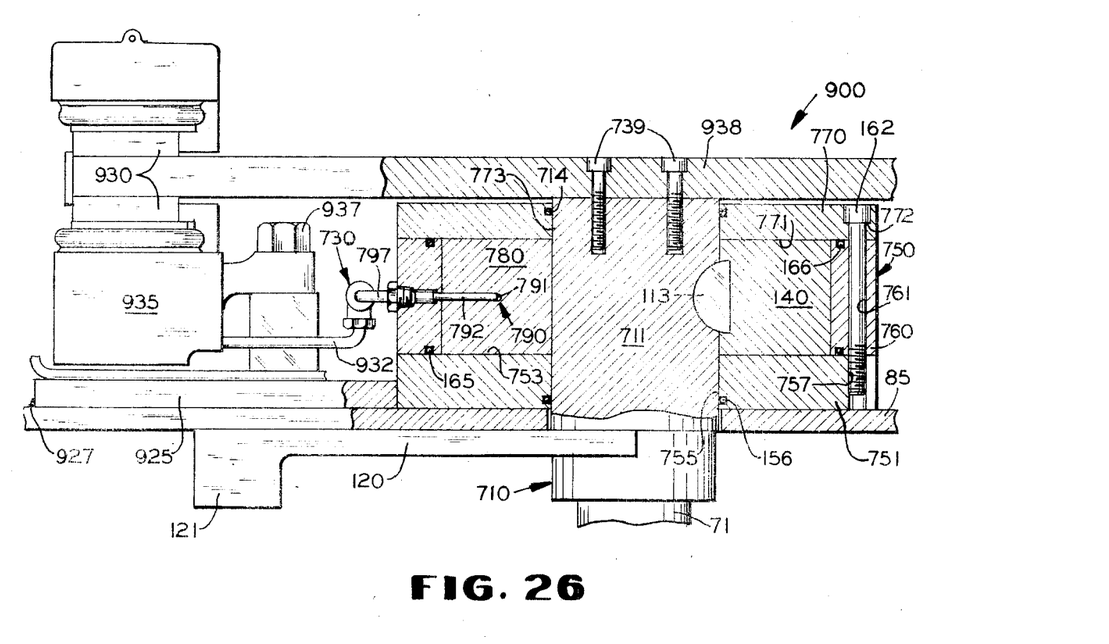
FIG. 26 is a reduced vertical sectional view of another embodiment similar to that shown in FIGS. 23 and 25 but with a disk brake mounted on the top of the king pin which is restricted by fluid operated calipers.

Still further there is shown in FIG. 26 a disk type brake 938 mounted by bolts 739 to the top of the extension 711 of the pivot or king pin 710, and the duct 932 from the shuttle valve 730 may be connected to caliper operating cylinder 935 for pads 930 against the disk brake 938. Similarly, this caliper cylinder 935 may be mounted by means of a bolt 937 to a plate 925, which in turn may be welded to one side of the damping device 750 and also welded at 927 to the wear plate 85 as shown in FIG. 26.

SUMMARY

Although several different embodiments and modifications of this invention are shown in the previously described figures, it is to be understood that many of the features of each embodiment may be interchanged with those of the other embodiments performing similar or additional functions without departing from the scope of this invention. For example, any one of the damping means disclosed may be used in combination with the brakes shown in FIGS. 23 through 26; and branch lines may be made to the passageways in many of the other devices than devices 700, 800 and 900, or even to both sides of the sector-shaped chamber itself for indicating pressure in this chamber as well as for operating the brakes.

While there is described above the observed principles of this invention in connection with specific apparatus, it is to be clearly understood that there may be many unobserved side effects which contribute substantially to the efficiency of this device and that this description is made only by way of example and not as a limitation to the scope of this invention.

We claim:
1. In combination with a pair of articulated vehicles, an automatic device (50, 60, 100, 200, 300, 400, 500, 600, 700, 800, 900) for damping quick relative angular movements between said two articulated vehicles (30, 40; 70, 80) having a pivotal connection between said vehicles, the device comprising:
 (a) a pivot pin (52, 110, 210, 410, 610, 710) for said connection mounted on one vehicle,
 (b) an arm (55, 56; 120, 130) anchored to said pivot pin for releasable engagement with the other vehicle whereby said pivot pin will turn with said other vehicle relative to said one vehicle,
 (c) a vane (140, 141, 240, 340, 440) anchored to said pivot pin,
 (d) a pair of parallel walls (151, 170, 270, 370, 470, 570, 670, 770) spaced by a third wall (160, 560, 760) to form a sector shaped chamber (51, 150, 250, 350, 450, 550, 650, 750) in which said vane oscillates,
 (e) fluid in said chamber for damping the oscillations of said vane,
 (f) means for sealing said vane in said chamber including means (144) on said vane for sealing the spaced parallel radial sides and outer end of said vane against said parallel walls and said third wall, respectively, which sealing means includes means (146) for urging said sealing means into contact with said walls,
 (g) a passageway (190, 290, 390, 490, 590, 690, 790) for said fluid from one side of said chamber and said vane to the other, and
 (h) an adjustable continuously open orifice restricting means (195, 295, 393, 491, 591, 691, 695, 792) in said passageway for controlling the damping of said vane by said fluid.

2. The combination according to claim 1 wherein said arm is provided with a vertically offset portion (57, 58, 121, 131) to compensate for vertical angular variations between said vehicles.

3. The combination according to claim 1 including a wear resistant bearing for journalling said pivot pin.

4. The combination according to claim 3 wherein said pivot pin has an axial extension (111, 211, 411, 611, 711) on the opposite side of said bearing from said arm.

5. The combination according to claim 1 wherein said sector shaped chamber is formed in a cylindrical housing (51, 160, 560, 760) attached to said one vehicle, which housing houses said vane and the corresponding portion of said pivot pin.

6. The combination according to claim 5 wherein said housing is provided with seals (156, 165, 166, 714) for preventing the loss of said fluid therefrom.

7. The combination according to claim 1 wherein said passageway (190, 290, 490, 590, 690, 790) is in a housing for said chamber.

8. The combination according to claim 1 wherein said passageway (390) is in said vane.

9. The combination according to claim 1 wherein said adjustable orifice restricting means comprises a needle type valve (195, 295, 393, 491, 695, 792).

10. The combination according to claim 9 including means (197, 297, 394, 794) for presetting said valve and maintaining it in its preset position.

11. An automatic device (50, 60, 100, 200, 300, 400, 500, 600, 700, 800, 900) for damping quick relative angular movements between two articulated vehicles (30, 40; 70, 80) having a pivotal connection between said vehicles, the device comprising:
 (a) a pivot pin (52, 110, 210, 410, 610, 710) for said connection mounted on one vehicle,
 (b) an arm (55, 56; 120, 130) anchored to said pivot pin for releasable engagement with the other vehicle whereby said pivot pin will turn with said other vehicle relative to said one vehicle,
 (c) a vane (140, 141, 240, 340, 440) anchored to said pivot pin,
 (d) a sector shaped chamber (51, 150, 250, 350, 450, 550, 650, 750) in which said vane oscillates,
 (e) fluid in said chamber for damping the oscillations of said vane,
 (f) a passageway (190, 290, 390, 490, 590, 690, 790) for said fluid from one side of said chamber and said vane to the other,
 (g) an adjustable continuously open orifice restricting means (195, 295, 393, 491, 591, 691, 695, 792) in said passageway for controlling the damping of said vane by said fluid, and
 (h) a cam means (412, 140 (in FIGS. 17-22), 612) mounted on said pivot pin for operating said adjustable orifice restricting means.

12. An automatic device (50, 60, 100, 200, 300, 400, 500, 600, 700, 800, 900) for damping quick relative angular movements between two articulated vehicles (30, 40; 70, 80) having a pivotal connection between said vehicles, the device comprising:
 (a) a pivot pin (52, 110, 210, 410, 610, 710) for said connection mounted on one vehicle,
 (b) an arm (55, 56; 120, 130) anchored to said pivot pin for releasable engagement with the other vehicle whereby said pivot pin will turn with said other vehicle relative to said one vehicle,
 (c) a vane (140, 141, 240, 340, 440) anchored to said pivot pin,
 (d) a sector shaped chamber (51, 150, 250, 350, 450, 550, 650, 750) in which said vane oscillates,
 (e) fluid in said chamber for damping the oscillations of said vane,
 (f) a passageway (190, 290, 390, 490, 590, 690, 790) for said fluid from one side of said chamber and said vane to the other, and
 (g) an adjustable continuously open orifice restricting means (195, 295, 393, 491, 591, 691, 695, 792) in said passageway for controlling the damping of said vane by said fluid, said adjustable orifice restricting means comprising a series of parallel ducts (591, 691) between said passageway and each portion of said sector-shaped chamber, whereby said vane successively covers and uncovers said ducts to close and open them as it oscillates in said chamber to restrict and increase the amount of flow through said ducts into said passageway.

13. A device according to claim 12 including an adjustable valve stem (695) in said passageway.

14. A device according to claim 13 including a cam means (612) on said pivot pin for operating said valve stem.

15. An automatic device (50, 60, 100, 200, 300, 400, 500, 600, 700, 800, 900) for damping quick relative angular movements between two articulated vehicles (30, 40; 70, 80) having a pivotal connection between said vehicles, the device comprising:
   (a) a pivot pin (52, 110, 210, 410, 610, 710) for said connection mounted on one vehicle,
   (b) an arm (55, 56; 120, 130) anchored to said pivot pin for releasable engagement with the other vehicle whereby said pivot pin will turn with said other vehicle relative to said one vehicle,
   (c) a vane (140, 141, 240, 340, 440) anchored to said pivot pin,
   (d) a sector shaped chamber (51, 150, 250, 350, 450, 550, 650, 750) in which said vane oscillates,
   (e) fluid in said chamber for damping the oscillations of said vane,
   (f) a passageway (190, 290, 390, 490, 590, 690, 790) for said fluid from one side of said chamber and said vane to the other, said passageway including a branch duct (796, 797, 732, 733) to a pressure responsive switch for controlling a signal means responsive to a predetermined increase in pressure in said chamber, and
   (g) an adjustable continuously open orifice restricting means (195, 295, 393, 491, 591, 691, 695, 792) in said passageway for controlling the damping of said vane by said fluid.

16. An automatic device (50, 60, 100, 200, 300, 400, 500, 600, 700, 800, 900) for damping quick relative angular movements between two articulated vehicles (30, 40; 70, 80) having a pivotal connection between said vehicles, the device comprising:
   (a) a pivot pin (52, 110, 210, 410, 610, 710) for said connection mounted on one vehicle,
   (b) an arm (55, 56; 120, 130) anchored to said pivot pin for releasable engagement with the other vehicle whereby said pivot pin will turn with said other vehicle relative to said one vehicle,
   (c) a vane (140, 141, 240, 340, 440) anchored to said pivot pin,
   (d) a sector shaped chamber (51, 150, 250, 350, 450, 550, 650, 750) in which said vane oscillates,
   (e) fluid in said chamber for damping the oscillations of said vane,
   (f) a passageway (190, 290, 390, 490, 590, 690, 790) for said fluid from one side of said chamber and said vane to the other, said passageway including a branch duct (796, 797, 732) having a shuttle valve (730) to transmit the pressure of said fluid from that section of said chamber which is pressurized by said vane, and
   (g) an adjustable continuously open orifice restricting means (195, 295, 393, 491, 591, 691, 695, 792) in said passageway for controlling the damping of said vane by said fluid.

17. A device according to claim 16 including a fluid operated brake cylinder (735, 835, 935) connected to said shuttle valve, and a brake (736, 836, 936) connected to said pivot pin operated by said cylinder for further restricting the angular movement between said vehicles.

18. A device according to claim 17 wherein said brake is a drum type brake (738) having brake shoes (736) outside said drum.

19. A device according to claim 17 wherein said brake is a drum type brake (738) having brake shoes (836) inside said drum.

20. A device according to claim 17 wherein said brake is a disk type brake (938) having calipers (936) operated by said brake cylinder.

21. The combination according to claim 1 wherein said vehicles comprise an automobile (30) and trailer (40), and said connection comprises a hitch having a ball (53) and socket (45, 46) joint.

22. The combination according to claim 21 wherein said pivot pin (52) has said ball (53) at one end thereof.

23. The combination according to claim 1 wherein said pivotal connection between said two articulated vehicles (70, 80) comprises a slotted fifth wheel (75) on one vehicle and a king pin (110, 210, 410, 610, 710) on the other vehicle.

24. An automatic device (100, 200, 300, 400, 500, 600, 700, 800, 900) for damping quick relative angular movements between two articulated vehicles (70, 80) comprising:
   (a) a pivotal connection between said two articulated vehicles comprising a slotted fifth wheel (75) on one vehicle and a king pin (110, 210, 410, 610, 710) on the other vehicle,
   (b) an arm (55, 56; 120, 130) anchored to said king pin for releasable engagement with said one vehicle whereby said king pin will turn with said one vehicle relative to said other vehicle, said arm being provided with an elastic center portion (136) to permit compression thereof for fitting snugly into said slots which vary in width between different vehicles,
   (c) a vane (140, 141, 240, 340, 440) anchored to said king pin,
   (d) a sector shaped chamber (51, 150, 250, 350, 450, 550, 650, 750) in which said vane oscillates,
   (e) fluid in said chamber for damping the oscillations of said vane,
   (f) a passageway (190, 290, 390, 490, 590, 690, 790) for said fluid from one side of said chamber and said vane to the other, and
   (g) an adjustable continuously open orifice restricting means (195, 295, 393, 491, 591, 691, 695, 792) in said passageway for controlling the damping of said vane by said fluid.

25. The combination according to claim 1 including means for limiting the angle of oscillation of said vane.

26. The combination according to claim 25 wherein said limiting means limits the angular motion of said movable vane to about 208°.

References Cited

UNITED STATES PATENTS

| | | | |
|---|---|---|---|
| 740,473 | 10/1903 | Scherer | 188—93 |
| 1,652,254 | 12/1927 | Schlagenhauf. | |
| 2,170,898 | 8/1939 | Humphrey | 280—432 |
| 2,367,993 | 1/1945 | Bishop | 188—93 |
| 2,385,635 | 9/1945 | Maurer | 188—93 |
| 2,692,146 | 8/1954 | Black | 280—432 |
| 2,790,520 | 4/1957 | Kuhn | 188—93 |
| 3,328,051 | 6/1967 | Hope | 280—432 |
| 3,419,114 | 12/1968 | Rumsey | 188—93 X |
| 3,420,548 | 1/1969 | Wakeman | 280—432 |

FOREIGN PATENTS

| | | |
|---|---|---|
| 205,442 | 1/1957 | Australia. |
| 1,466,818 | 12/1966 | France. |

LEO FRIAGLIA, Primary Examiner

U.S. Cl. X.R.

188—93; 280—446

PO-1050
(5/69)

UNITED STATES PATENT OFFICE
CERTIFICATE OF CORRECTION

Patent No. 3,512,803      Dated May 19, 1970

Inventor(s) E. W. HINES et al

It is certified that error appears in the above-identified patent and that said Letters Patent are hereby corrected as shown below:

Column 1, line 23, "within" should read -- with --. Column 6, line 12, "7" should read -- 70 --; line 13, "disclose" should read -- disclosed --. Column 9, line 17, after "283" insert -- 383 --. Column 10, line 21, "in" should read -- is --; line 50, after "lock" insert -- screw --. Column 11, line 24, "691" should read -- 692 --; line 61, "passagseways" should read -- passageways --.

SIGNED AND SEALED

SEP 29 1970

(SEAL)
Attest:

Edward M. Fletcher, Jr.
Attesting Officer

WILLIAM E. SCHUYLER, JR.
Commissioner of Patents